(12) United States Patent
Farah et al.

(10) Patent No.: US 8,661,835 B2
(45) Date of Patent: *Mar. 4, 2014

(54) BUSHING FOR TORQUE LOAD TRANSFER ATTACHMENT HARDWARE

(75) Inventors: Jorge I. Farah, Glastonbury, CT (US); Jason Hickman, Royal Palm Beach, FL (US); Jose Cintron, Tequesta, FL (US)

(73) Assignee: United Technologies Corporation, Hartford, CT (US)

( * ) Notice: Subject to any disclaimer, the term of this patent is extended or adjusted under 35 U.S.C. 154(b) by 1100 days.

This patent is subject to a terminal disclaimer.

(21) Appl. No.: 12/648,061

(22) Filed: Dec. 28, 2009

(65) Prior Publication Data

US 2010/0115965 A1    May 13, 2010

Related U.S. Application Data

(60) Division of application No. 11/514,293, filed on Aug. 31, 2006, now Pat. No. 7,721,522, which is a continuation-in-part of application No. 11/326,004, filed on Jan. 5, 2006, now Pat. No. 7,581,399.

(51) Int. Cl.
    *F02C 7/20* (2006.01)

(52) U.S. Cl.
    USPC ............... 60/798; 60/796; 411/549; 411/553

(58) Field of Classification Search
    USPC ............ 60/232, 796, 798; 411/349, 549, 553
    See application file for complete search history.

(56) References Cited

U.S. PATENT DOCUMENTS

| | | | |
|---|---|---|---|
| 1,296,275 A * | 3/1919 | Firth | 220/250 |
| 1,306,100 A * | 6/1919 | Chadwick | 411/368 |
| 1,958,497 A * | 5/1934 | Rivers | 411/368 |
| 2,441,871 A * | 5/1948 | Dansereau | 439/238 |
| 3,171,182 A * | 3/1965 | Danehy | 411/552 |
| 3,264,005 A * | 8/1966 | Bialkowski | 277/529 |
| 3,561,707 A | 2/1971 | Strock | |
| 3,583,416 A * | 6/1971 | Nebesnik et al. | 137/15.23 |
| 3,664,434 A * | 5/1972 | Connor et al. | 172/536 |
| 3,787,103 A | 1/1974 | MacMillan | |
| 3,986,780 A * | 10/1976 | Nivet | 403/353 |
| 4,597,258 A | 7/1986 | Harris | |
| 4,748,806 A | 6/1988 | Drobny | |
| 4,808,069 A | 2/1989 | Bonner et al. | |
| 4,934,861 A * | 6/1990 | Weeks et al. | 403/408.1 |
| 5,088,279 A * | 2/1992 | MacGee | 60/226.1 |
| 5,304,021 A * | 4/1994 | Oliver et al. | 411/121 |
| 5,533,330 A | 7/1996 | Mullooly et al. | |
| 6,027,071 A * | 2/2000 | Lair | 244/110 B |
| 7,506,514 B2 | 3/2009 | Muldoon et al. | |
| 7,553,279 B1 * | 6/2009 | Phillips et al. | 600/234 |
| 7,581,399 B2 * | 9/2009 | Farah et al. | 60/770 |
| 7,588,416 B2 | 9/2009 | Bouru | |
| 7,591,622 B2 | 9/2009 | de Jesus et al. | |
| 7,617,685 B2 * | 11/2009 | Norman et al. | 60/770 |
| 7,721,522 B2 * | 5/2010 | Farah et al. | 60/39.5 |
| 7,814,753 B2 * | 10/2010 | Farah et al. | 60/796 |
| 7,975,488 B2 * | 7/2011 | Farah et al. | 60/770 |
| 2004/0120615 A1 | 6/2004 | Chase | |
| 2008/0022689 A1 | 1/2008 | Farah et al. | |

* cited by examiner

*Primary Examiner* — Ehud Gartenberg
*Assistant Examiner* — Lorne Mead
(74) *Attorney, Agent, or Firm* — Kinney & Lange, P.A.

(57) ABSTRACT

A bushing for assembling an exhaust duct liner with an exhaust duct in a gas turbine engine comprises a body, a bushing opening and a first tab. The body is insertable into a duct opening in an exhaust duct. The bushing opening extends through the body to receive a shaft of a liner fastener. The first tab protrudes from the body to extend into an interior of the duct to prevent rotation of a head of the liner fastener.

15 Claims, 6 Drawing Sheets

BUSHING FOR TORQUE LOAD TRANSFER ATTACHMENT HARDWARE

CROSS-REFERENCE TO RELATED APPLICATION(S)

This application claims priority as a divisional application under 35 U.S.C. §121 of earlier filed application Ser. No. 11/514,293 (now U.S. Pat. No. 7,721,522) entitled "TORQUE LOAD TRANSFER ATTACHMENT HARDWARE" by Jorge I. Farah, et al. and filed Aug. 31, 2006, which is a continuation-in-part of application Ser. No. 11/326,004 (now U.S. Pat. No. 7,581,399) entitled "DAMPED COIL PIN FOR ATTACHMENT HANGER HINGE" by Jorge I. Farah, et al. and filed Jan. 5, 2006.

STATEMENT OF GOVERNMENT INTEREST

The U.S. Government has a paid-up license in this invention and the right in limited circumstances to require the patent owner to license others on reasonable terms as provided for by the terms of Contract No. N00019-02-C-3003 awarded by the United States Navy.

BACKGROUND

This invention relates generally to gas turbine engines and more particularly to exhaust duct liner attachment systems and methods. In gas turbine engines, it is necessary to protect exhaust ducts with an insulating shield in order to prevent heated core gases from damaging the exhaust ducts. Typically, exhaust ducts are made from titanium or titanium alloys and have temperature limits in the vicinity of 400° F. (204.4° C.). Exhausted core gases can reach temperatures upwards of 3500° F. (1648.89° C.). It is, therefore, necessary to line exhaust ducts with a material capable of withstanding the peak temperatures of the core gases and that prevents the exhaust duct from reaching its temperature limitations.

For particular operations, particularly in military operations, it is desirable to have aircraft with conventional take-off and landing (CTOL) capabilities, and short take-off, vertical landing (STOVL) capabilities. CTOL requires conventional thrusting of the aircraft in the horizontal direction, while STOVL requires thrusting of the aircraft in vertical and intermediate directions. Some dual capability aircraft designs thus employ variable direction exhaust ducts, such as three bearing swivel ducts (3BSDs), for directing thrust produced by the exhaust nozzle in both the horizontal and vertical directions. Variable direction exhaust ducts typically comprise multiple co-axial exhaust duct segments having angled junctions, whereby the segments can be rotated with respect to each other to redirect the direction of thrust. The exhaust duct segments interface through swivel bearing joints, which extends partially into the assembled exhaust duct. This has the effect of restricting the diameter of the exhaust duct near the swivel bearing joints. In order to properly pre-load the swivel bearings, it is typically necessary to assemble the exhaust duct segments before attaching exhaust duct liners to the exhaust duct segments. It is, therefore, necessary to have an exhaust duct liner suspension system that can be inserted past the swivel bearing joint in, and secured to, an already assembled exhaust duct. This typically requires insertion of fasteners into the interior of the duct from the exterior, which can lead to difficulties in aligning fasteners with the suspension system, and dropping of fasteners into the exhaust duct, from which they are not easily recovered. It would be desirable to simplify the installation process of such suspension systems to, for example, reduce installation time and insure proper installation alignment.

SUMMARY

The present invention is directed to a bushing for assembling an exhaust duct liner with an exhaust duct in a gas turbine engine. The bushing comprises a body, a bushing opening and a first tab. The body is insertable into a duct opening in an exhaust duct. The bushing opening extends through the body to receive a shaft of a liner fastener. The first tab protrudes from the body to extend into an interior of the duct to prevent rotation of a head of the liner fastener.

DETAILED DESCRIPTION

Figure 1:
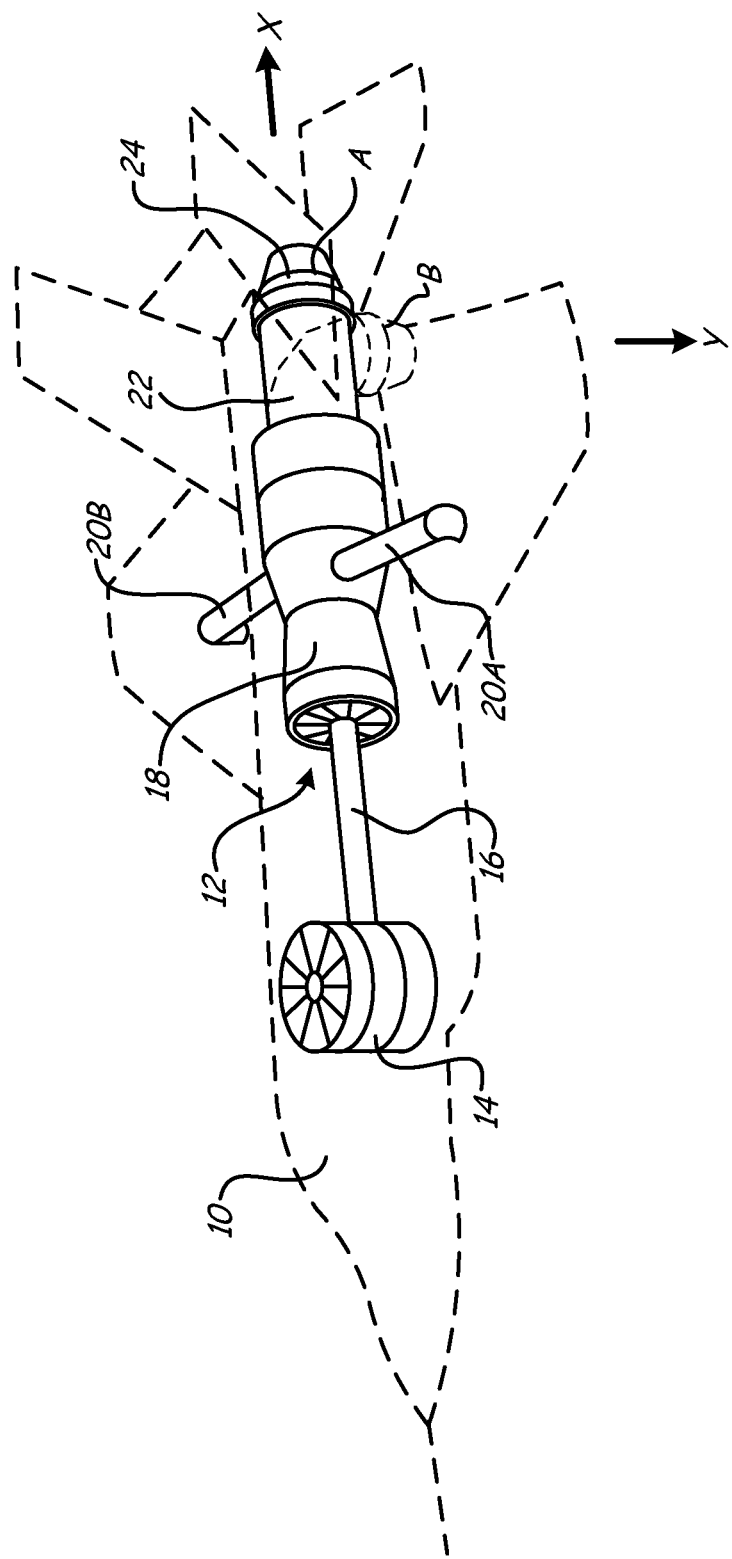
FIG. 1 shows an aircraft having a STOVL capable gas turbine engine including a three bearing swivel duct.

FIG. 1 shows jet-powered aircraft 10 (shown in phantom) having short take-off vertical landing (STOVL) gas turbine engine 12. Engine 12 includes multiple thrust producing and thrust directing elements that enable aircraft 10 to take-off on a shortened runway and land vertically. Engine 12 includes lift fan 14, lift fan shaft 16, power plant 18, control ducts 20A and 20B, three bearing swivel duct 22 and exhaust nozzle 24. Power plant 18 is the primary thrust-producing element of engine 12 and is used to produce thrust in the x direction. Three bearing swivel duct (3BSD) 22 directs the thrust of power plant 18 in the x direction when in configuration A (as shown by 3BSD 22 in solid lines). 3BSD 22 is adjustable to redirect the thrust of power plant 18 in the y direction when in configuration B (as shown by 3BSD 22 in dashed lines). 3BSD 22 is also used to produce thrust in intermediate directions. Nozzle 24 increases and focuses the thrust produced by power plant 18 and is secured to the tail end of 3BSD 22. 3BSD 22 is used in configuration A, for example, during traditional take off and flight operations of aircraft 10 in the x direction. 3BSD 22 is positioned in intermediate directions, for example, to facilitate short take-off operations. 3BSD 22 is positioned in configuration B, for example, to assist lift fan 14 in vertical landing operations. Lift fan 14 is selectively driven by power plant 18 through lift fan shaft 16, and is used to produce thrust in the y direction near the forward portion of aircraft 10. With 3BSD 22 producing thrust near the aft portion of aircraft 10, lift fan 14 and power plant 18 control the pitch of aircraft 10. During vertical landing operations, control ducts 20A and 20B redirect a portion of the thrust produced by power plant 18 in the y direction underneath the wings, at a location away from the axis on which power plant 18 and lift fan 14 produce thrust in the y direction. Typically, control ducts 20A and 20B are selectively engaged to balance the roll of aircraft 10 during vertical landing and take-off operations.

Figure 2A:
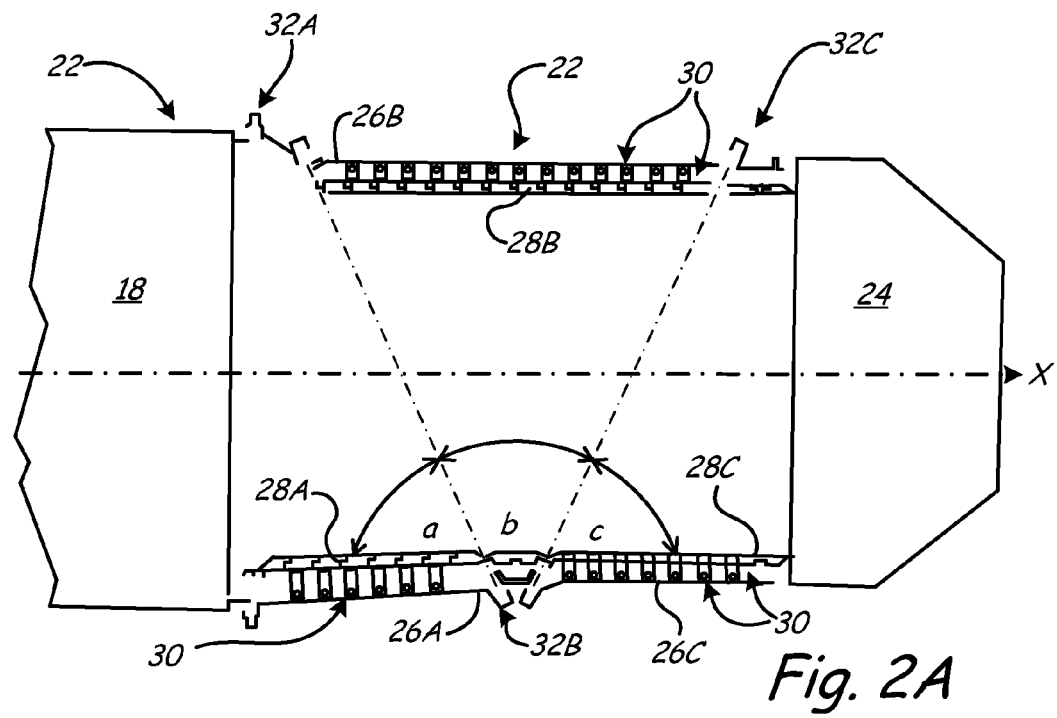
FIG. 2A shows the three bearing swivel duct of FIG. 1 configured for conventional operation.
Figure 2B:
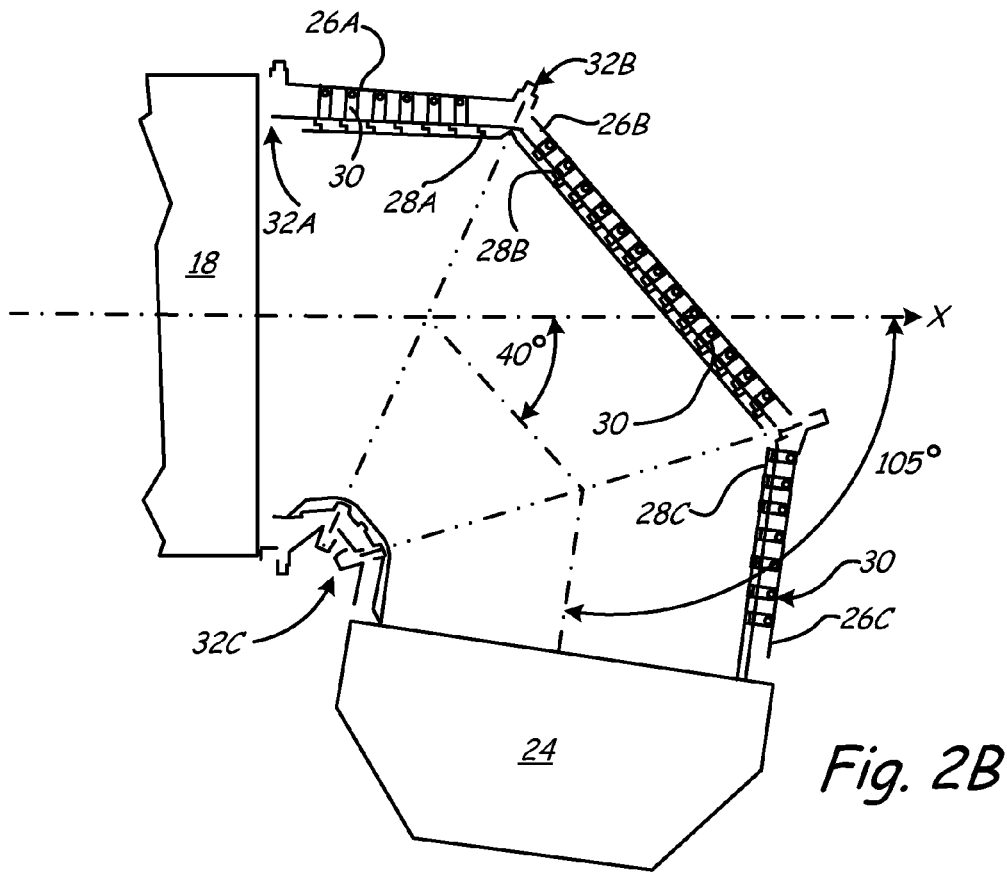
FIG. 2B shows the three bearing swivel duct of FIG. 1 configured for vertical landing or take-off operation.

FIG. 2A shows three bearing swivel duct (3BSD) 22 of FIG. 1 in configuration A with nozzle 24 oriented along the x axis. FIG. 2B shows 3BSD 22 in configuration B with nozzle 24 oriented approximately 105° from the x axis. 3BSD 22 is positioned between power plant 18 and nozzle 24 of engine 12. 3BSD 22 comprises front duct 26A, intermediate duct 26B, rear duct 26C, front liner 28A, intermediate liner 28B, rear liner 28C, a plurality of suspension systems 30 and swivel bearings 32A-32C.

Front duct 26A is connected with power plant 18 along a vertical axis using forward swivel bearing 32A. Swivel bearing 32A allows front duct 26A to rotate approximately 360° with respect to power plant 18. Swivel bearing 32A is controlled by a central control system of aircraft 10 that positions front duct 26A for each desired operational mode of aircraft 10. Similarly, intermediate duct 26B is connected with front duct 26A using intermediate swivel bearing 32B. Swivel bearing 32B is centrally controlled and allows intermediate duct 26B to rotate approximately 360° with respect to front duct 26A. The body of intermediate duct 26B is angled at angle b and the aft edge of front duct 26A is angled at angle a such that when they rotate with respect to each other, the position of nozzle 24 rotates about the x-axis. Likewise, rear duct 26C is connected with intermediate duct 26B using aft swivel bearing 32C. Swivel bearing 32C is centrally controlled and allows rear duct 26C to rotate approximately 360° with respect to intermediate duct 26B. With the body of intermediate duct 26B being angled at angle b, the forward edge of rear duct 26C is angled at angle c such that when it rotates, the position of nozzle 24 rotates about the x-axis. Angles a, b and c are selected such that in configuration A 3BSD is generally horizontal, but can be pivoted to reposition nozzle 24. FIG. 2B shows front duct 26A rotated 180° with respect to power plant 18, intermediate duct 26B rotated 180° with respect to front duct 26A and rear duct 26C rotated 180° with respect to intermediate duct 26B. Thus, due to the angles at which front duct 26A, intermediate duct 26B and rear duct 26C are joined (angles a, b and c), 3BSD 22 is angled downward a total of about 105° with respect to the x axis in configuration B. Nozzle 24 can also be oriented approximately 40° from the x-axis (e.g. for short take-off operation) by rotating front duct 26A, intermediate duct 26B and rear duct 26C approximately 180° each.

Because of manufacturing and assembly reasons, such as those described above, exhaust liners 28A-28C must be assembled with exhaust ducts 26A-26C after exhaust ducts 26A-26C have been assembled to each other. Therefore, front liner 28A, intermediate liner 28B and rear liner 28C are suspended from front duct 26A, intermediate duct 26B and rear duct 26C, respectively, using a plurality of suspension systems 30 that can be secured from the exterior of ducts 26A-26C. Suspension systems 30 span the difference in diameters of ducts 26A-26C and liners 28A-28C, and can be tailored to specific lengths. Typically there are about twenty rows of suspension systems evenly distributed along the circumference of each duct segment, with rows at wider parts of the ducts having more suspension systems. To simplify and improve assembly and disassembly of the exhaust liners and the exhaust ducts, suspension systems 30 include duct torque bushings for receiving the fasteners used to join suspensions systems 30 with exhaust ducts 26A-26C.

Figure 3:
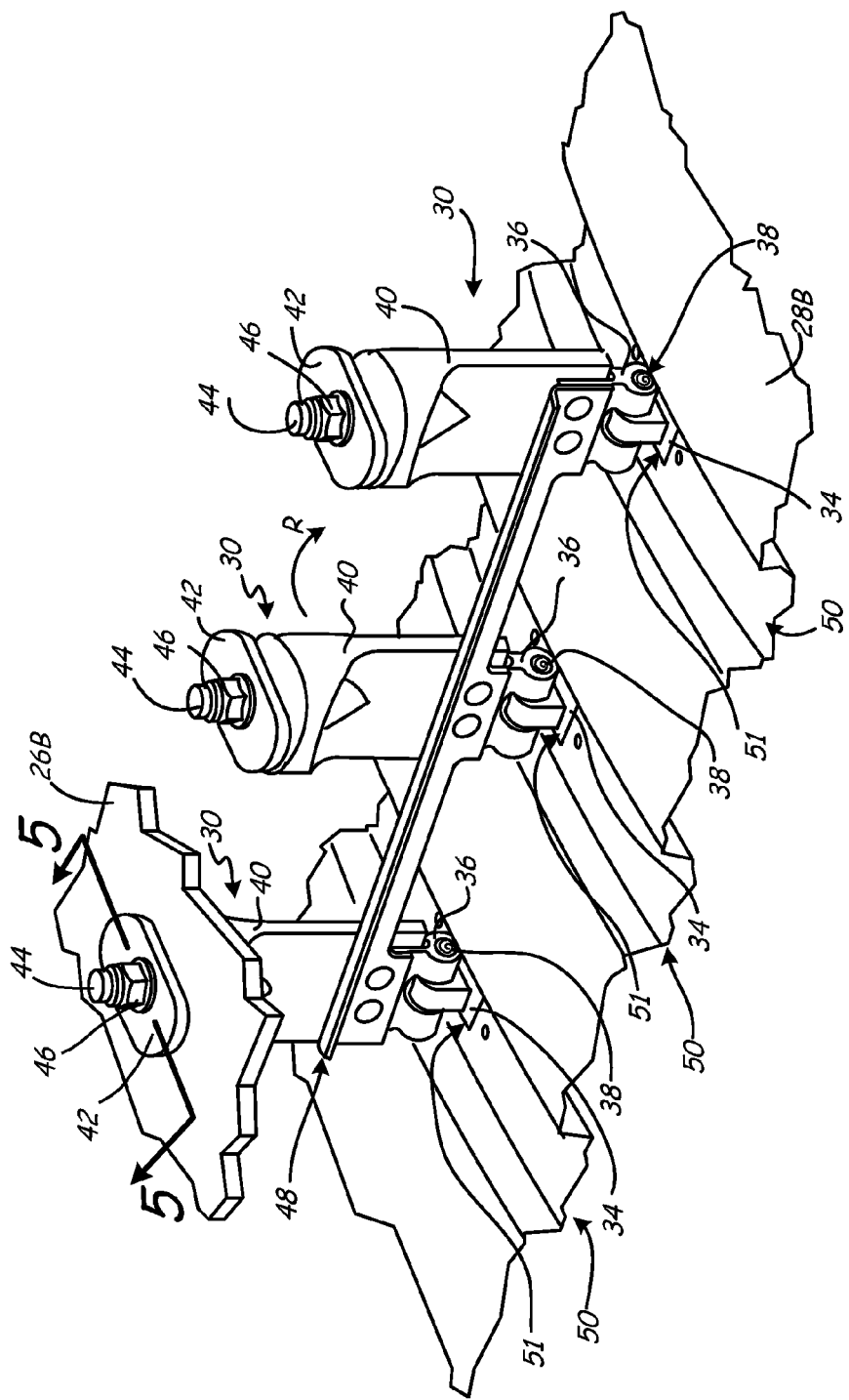
FIG. 3 shows a cut-away portion of the three bearing swivel duct of FIGS. 2A and 2B.

FIG. 3 shows a cut-away portion of intermediate duct 26B and intermediate duct liner 28B connected by suspension systems 30. Suspension systems 30 include cold sheet bracket 34, hinge 36, pin 38, hanger 40, bushing 42, fastener 44, lock nut 46 and axial stiffener 48. Suspension systems 30 connect intermediate duct 26B with intermediate liner 28B.

Cold sheet bracket 34 is connected with intermediate duct liner 28B at corrugation 50. Cold sheet bracket 34 is inserted through hole 51 in duct liner 28B from the interior of duct liner 28B. Hinge 36 forms a rotatable connection with bracket 34 utilizing pin 38. Pin 38 is compression fit into a bore in cold sheet bracket 34 such that pin will not rotate with respect to cold sheet bracket 34, but hinge 36 is rotatable about pin 38. Typically, each cold sheet bracket, hinge and pin are pre-assembled as a hinge assembly before each bracket 34 is joined with liner 28B. Once the pre-assembled hinge assemblies are fastened to liner 28B, hangers 40 are joined with each hinge 36 from the exterior of liner 28B. Hangers 40 are connected to each other by axial stiffener 48, which, among other things, provides axial load sharing between hangers 40. Hangers 40, hinge 36 and axial stiffener 48 are fastened together with, for example threaded fasteners or rivets. Due to stiffener 48, hangers 40 are simultaneously rotatable downward into corrugations 50. Hangers 40 are rotated away from stiffener 48, as indicated by arrow R, such that stiffener 48 does not prevent hangers 40 from laying down into corrugations 50. Thus, suspension systems 30 are insertable past swivel bearing joints 32A-32C during assembly of 3BSD 22.

After exhaust ducts 26A-26C are assembled to each other and to aircraft 10, intermediate liner 28B is inserted into exhaust duct 26B. Hanger 40 is then rotated upward such that suspension system 30 can be joined with exhaust duct 26B with bushing 42, fastener 44 and lock nut 46. Bushing 42 provides a mistake-proof method for joining fastener 44 with hanger 40. For example, bushing 42 insures that fastener 44 is properly seated with hanger 40 and allows for improved torque transfer from fastener 44 to duct 26B during assembly and disassembly of nut 46 and fastener 44.

Figure 4:
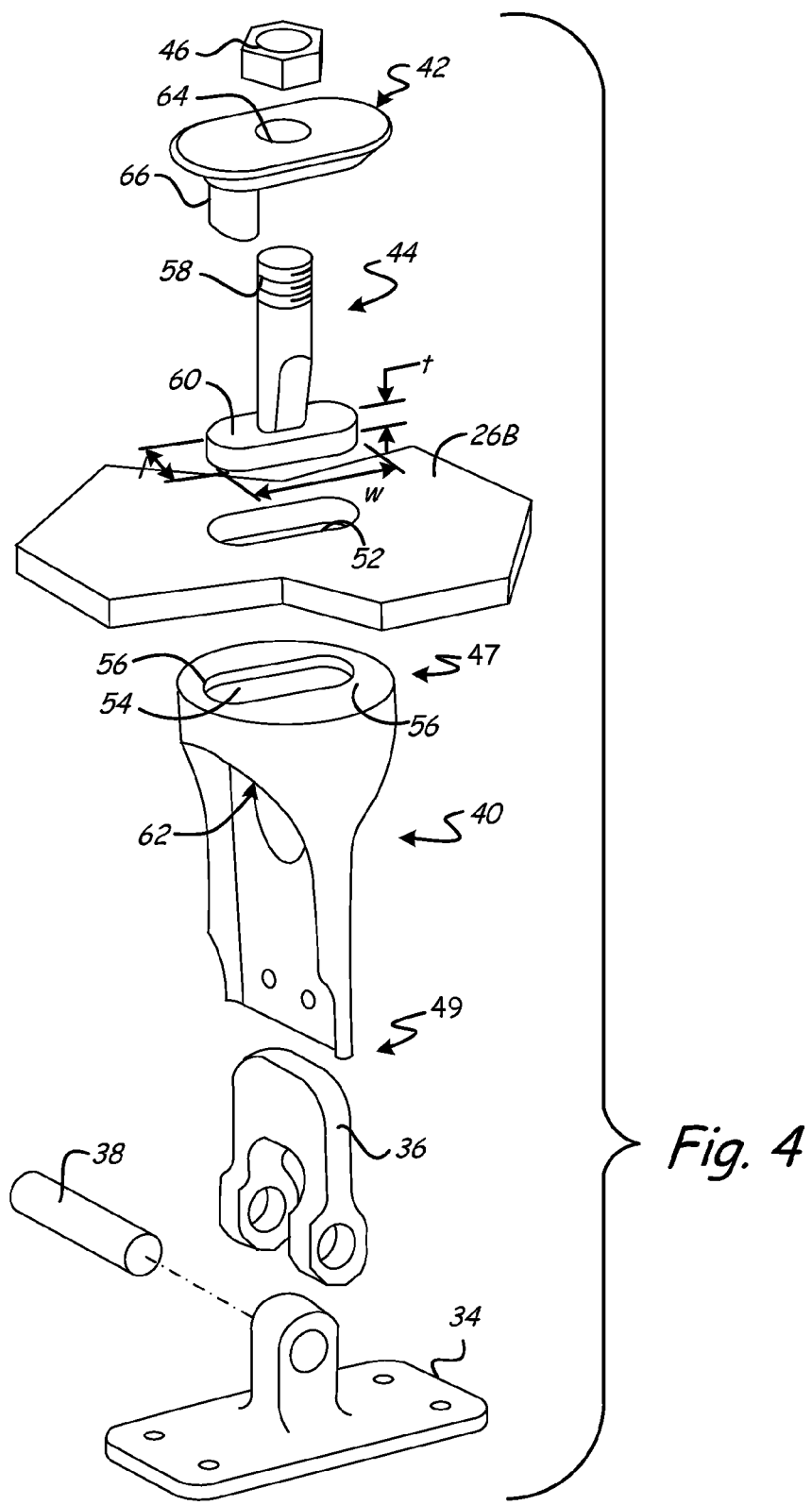
FIG. 4 shows an exploded view of a duct liner suspension system used in the three bearing swivel duct of FIG. 3.

FIG. 4 shows an exploded view of duct liner suspension system 30 used in the three bearing swivel duct of FIG. 3. Suspension system 30 includes cold sheet bracket 34, hinge 36, pin 38, hanger 40, bushing 42, fastener 44 and lock nut 46. Fastener 44, nut 46 and bushing 42 link first end 47 of hanger 40 with intermediate duct 26B, while cold sheet bracket 34, hinge 36 and pin 38 link second end 49 of hanger 40 with intermediate liner 28B. After cold sheet bracket 34 and hanger 40 are linked with liner 28B, and liner 28B has been inserted into duct 26B, hanger 40 is rotated to extend radially outward from liner 28B to meet an interior facing side of duct 26B. The position of hanger 40 is variable about pin 38 via oval shaped bores in hinge 36 such that first end 47 of hanger 40 can be rotated past duct 26B and then pulled flush with the interior of duct 26B.

Intermediate duct 26B includes duct opening 52, and first end 47 of hanger 40 includes hanger opening 54 and fastener flanges 56. When first end 47 is placed in position for assembly, duct opening 52 and hanger opening 54 substantially align with each other such that they are able to receive fastener 44. Fastener 44 includes shaft 58 and head 60. In one embodiment, shaft 58 comprises threaded channels for receiving and engaging corresponding channels in lock nut 46. Head 60 comprises an oblong shape, such that its width $\omega$ is longer than its length l. In one embodiment fastener 44 is a T-bolt. The profile of openings 52 and 54 correspond to the profile, i.e. length and width, of head 60 such that fastener 44 will pass through openings 52 and 54 only when the widths and lengths of the three features are substantially aligned. In the embodiment shown, openings 52 and 54 are positioned such that the length of each hole is parallel to the centerline of engine 12, but in other embodiments could be perpendicular to the centerline or have some other configuration. Once fastener 44 is inserted into openings 52 and 54, head 60 is rotatable in opening 62 of hanger 40. For proper installation of suspension system 30, head 60 is rotated, preferably ninety degrees, such that head 60 engages flanges 56 and fastener 44 is prevented from pulling out of openings 52 and 54.

Bushing 42 is insertable into opening 52 such that hole 64 fits around shaft 58. Hole 64 provides a tight tolerance fit around shaft 58, and bushing 42 provides a tight tolerance fit in opening 52 such that duct 26B is sealed by bushing 42. Additional washers can be included between duct 26B and nut 46, or duct 26B and head 60 to further enhance the seal once assembled. Bushing 42 includes tab 66, which provides for proper orientation of fastener head 60, and provides torque load distribution for removing nut 46 from shaft 58 during disassembly of suspension system 30.

Figure 5:
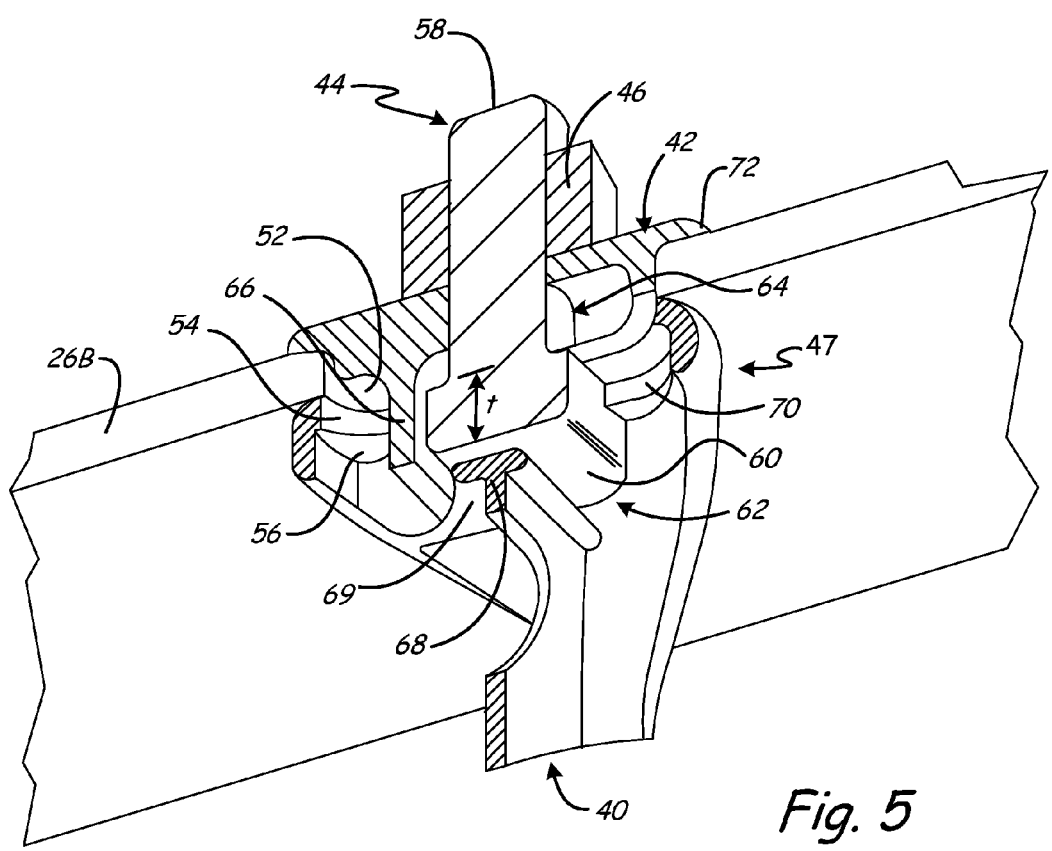
FIG. 5 shows a partially cut away sectional view of a duct liner suspension system as taken along section 5-5 of FIG. 3.

FIG. 5 shows a partially cut away sectional view of duct liner suspension system 30 as taken along section 5-5 of FIG. 3. Suspension system 30 is assembled with intermediate duct 26B such that bushing 42 is properly seated in duct opening 52 and head 60 of fastener 44 is properly aligned with hanger opening 54.

First end 47 of hanger 40 is positioned such that hanger opening 54 aligns with duct opening 52 of intermediate duct 26B. Fastener 44 is inserted into openings 52 and 54 such that head 60 rests on drop plate 68 located in opening 62 of hanger 40. Drop plate 68 also includes webbing 69, which strategically increases the width of drop plate 68. One or more webbings are placed around drop plate 68 to prevent fastener 44 from dropping through opening 62 during rotation or if it becomes canted in openings 52 and 54 during installation. For proper installation of suspension system 30, head 60 is rotated approximately ninety degrees from the orientation in which it passed through openings 52 and 54 such that its width is substantially transverse to the width of openings 52 and 54. Thus, fastener 44 is restrained from pulling out of openings 52 and 54 by flanges 56.

Hanger 40 also includes web 70 for impeding rotation of head 60 of fastener 44. Web 70 comprises a flange or tab that extends into opening 54 from flange 56 such that it engagable with head 60 when head 60 is rotated in opening 62. During assembly of suspension system 30, nut 46 is torqued onto shaft 58 thereby causing clockwise (as viewed from the exterior of duct 26B) rotation of head 60. Web 70 pushes back on head 60 thereby holding head 60 substantially perpendicular to opening 54 while suspension system 30 is being assembled. A second web is included on hanger 40 positioned one hundred eighty degrees from web 70 on opening 54 such that it assists web 70 in restraining rotation of head 60.

Likewise, in order to prevent head 60 from spinning during disassembly of suspension system 30, bushing 42 is provided with tab 66. Tab 66 impedes free rotation of head 60 in opening 62 in the counterclockwise direction. Tab 66 transmits torque during disassembly of suspension system 30 by substantially preventing rotation of head 60. One alternative to use of tab 66 is to rely on web 70 to prevent counterclockwise rotation of head 60. Often times, however, the torque required to dislodge nut 46 from shaft 58 exceeds the torque necessary to fully seat nut 46 during installation, the torque for which web 70 is designed to withstand. This is typically due to residual heat stresses imparted in fastener 44, dirt, corrosion or the like. The torque required to remove nut 46 could damage hanger 40 before head 60 would even be allowed to rotate in the counterclockwise direction until it contacted web 70. Thus, for weight and space considerations, web 70 is typically designed to withstand only the necessary assembly torque imparted in fastener 44. Another alternative to use of tab 66 is to include additional webs on opening 54 to prevent counterclockwise rotation of head 60. This alternative, however, could interfere with the capability of head 60 to be rotated perpendicular to opening 54 (e.g. prevent head 60 from engaging flange 56) after being inserted into opening 54. Therefore, tab 66 is included in bushing 42 to transmit disassembly torque to duct 26B, which can absorb much larger stresses than hanger 40.

Tab 66 also ensures that head 60 is engaged with web 70 during installation to prevent improper alignment of head 60. Bushing 42 is seated in opening 52 of duct 26B and includes flange 72 around its outer periphery. Flange 72 prevents bushing 42 from passing through and into duct 26B and also assists in sealing opening 52. Tab 66 prevents bushing 42 from being inserted into opening 52 unless head 60 is rotated substantially transverse to openings 52 and 54 and flush with web 70. It is preferable that head 60 is transverse to openings 52 and 54 so that maximum tension will be transmitted from duct 26B to hanger 40 through shaft 58.

The sizing and positioning of tab 66 is such that bushing 42 can be inserted into opening 52 in two positions; with tab 66 on either the upstream or downstream side of opening 52. The exact sizing and dimensions of bushing 42 and tab 66 depends on the specific design parameters of suspension system 30 and aircraft 10. When bushing 42 is inserted into opening 52, tab 66 extends into opening 54 such that its width is substantially transverse to the widths of openings 52 and 54. The width of tab 66 is then substantially aligned with and abutted against the width of head 60, ensuring that head 60 is properly transverse with opening 54 when suspension system 30 is assembled. Also, the length of tab 66 is aligned with and abutted against the side of the web opposite web 70 (not seen in FIG. 5).

The length of tab 66, i.e. the distance it extends into opening 62 of hanger 40 depends on the position of drop plate 68 and the thickness t (FIG. 4) of head 60. In the various embodiments of the present invention, tab 66 extends to within close proximity of drop plate 68 such that head 60 is prevented from rotating by tab 66. In other words, the distance between the bottom of tab 66 and the top of drop plate 68, when assembled, is less than thickness t of head 60.

Figure 6A:
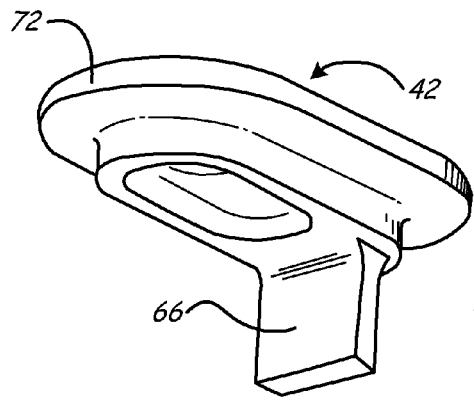
FIG. 6A shows a perspective view of a torque bushing of the duct liner suspension system of FIG. 4.
Figure 6B:
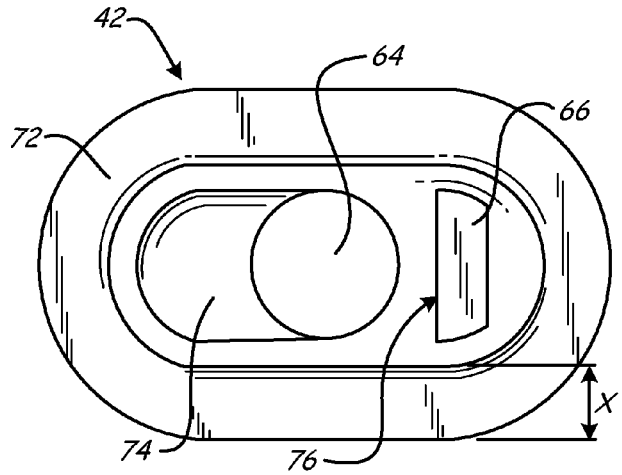
FIG. 6B shows a bottom view of the torque bushing of FIG. 6A.
Figure 6C:
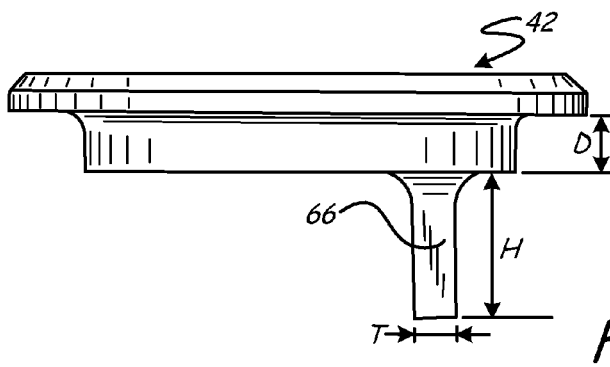
FIG. 6C shows a side view of the torque bushing of FIG. 6A.

FIGS. 6A-6C show perspective, side and bottom views of bushing 42, respectively. Bushing 42 can be comprised of any high strength, heat resistant material, such as stainless steel or titanium, that is compatible with other materials used in suspension system 30. Specifically, bushing 42 is comprised of a material having a coefficient of thermal expansion compatible with the coefficients of thermal expansion of hanger 40, fastener 44 and nut 46. For example, after undergoing thermal expansion consistent with temperatures reached in engine 18, opening 52 remains sealed with duct 26B, yet does not cause loss of preload in fastener 44, duct 26B or hanger 40.

FIG. 6B shows a bottom view of bushing 42. Bushing 42 includes bushing opening 64, flange 72, depression 74 and tab 66. The precise dimensions of bushing 42 depend on the specific engine and aircraft combination and the forces bushing 42 is required to transmit.

Opening 64 is generally positioned at the center of the main body of bushing 42 and has a diameter that approximates the diameter of shaft 58 of fastener 44 such that a seal is formed. Depression 74 surrounds opening 64 and extends into the underside of bushing 42, primarily as a weight reduction means. The profile of the main body of bushing 42 approximates the profile of opening 52 in duct 26B such that the main body assist in transmitting torque from tab 66 to duct 26B. The body of bushing 42 also matches with opening 52 such that bushing 42 will retain shaft 58 of fastener 44 aligned in opening 64.

Flange 72 extends around the periphery of bushing 42 such that bushing 42 cannot pass through duct opening 52. Flange 72 has width X such bushing 42 forms a seal with opening 52 of duct 26B. Flange 72 also provides nut 46 with a ledge for transmitting tensile forces from fastener 44 to duct 26B.

Tab 66 has a "D" shaped cross-section, but in other embodiments can have other shapes. Tab 66 includes generally planar face 76 for aligning with the width of head 60 of fastener 44. Face 76 is generally planar such that it fully engages head 60 and evenly transmits torque to duct 26B.

FIG. 6C shows a side profile of bushing 42, in which the main body of bushing 42 is shown having depth D, and tab 66 is shown having thickness T. In one embodiment, depth D of the main body of bushing 42 is sized to match the thickness of duct 26B such that head 60 slightly compresses bushing 42 when suspension system 30 is assembled.

Tab 66 functions to transfer torque from head 60 to duct 26B. Thickness T of bushing 44 can be increased to absorb higher torque loads for use with, for example, heavier duct liners. In other embodiments of the invention, bushing 42 includes additional features, such as a second tab, for further improving the torque transfer capabilities of bushing 42.

Figure 7:
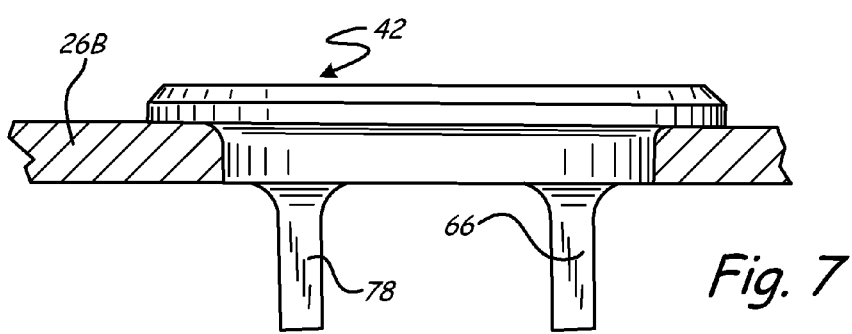
FIG. 7 shows a side view of a torque bushing having two torque tabs inserted into an exhaust duct.

FIG. 7 shows a second embodiment of bushing 42 in which second torque tab 78 is added. Torque tab 78 allows torque to be transmitted from head 60 to duct 26B from another source such that heavier forces can be used for assembling heavier suspension systems.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A bushing for assembling an exhaust duct liner with an exhaust duct in a gas turbine engine, the bushing comprising:
a body insertable into a duct opening in the exhaust duct;
a bushing opening extending through the body for receiving a shaft of a liner fastener;
a first tab protruding from the body for extending into an interior of the exhaust duct to prevent rotation of a head of the liner fastener;
a second tab protruding from the body for extending into an interior of the exhaust duct, the second tab spaced along the bushing opening opposite the first tab; and
a peripheral flange extending along an entirety of a periphery of the body to prevent the body from passing through the duct opening.

2. The bushing of claim 1 wherein the body includes:
an outer end wall;
an inner end wall disposed generally parallel to the outer end wall;
a side wall insertable into the duct opening and connecting the outer end wall and the inner endwall;
wherein the bushing opening extends perpendicularly through the outer and inner end walls; and
wherein the side wall has a cross-sectional profile having a major axis and a minor axis in a plane perpendicular to an axis of the bushing opening.

3. The bushing of claim 2 wherein the bushing opening comprises a circular opening positioned at the intersection of the major axis and the minor axis.

4. The bushing of claim 3 wherein the body has an oval cross-sectional profile.

5. The bushing of claim 2 wherein the tab is positioned on the major axis.

6. The bushing of claim 5 wherein the tab includes a flat surface extending in the direction of the minor axis.

7. The bushing of claim 5 wherein the body includes a depression adjacent the bushing opening to reduce weight.

8. The bushing of claim 2 wherein:
the peripheral flange extends from the outer end wall; and
the first tab extends from the inner end wall and is spaced from the side wall.

9. A bushing assembly for mounting an exhaust duct, the assembly comprising:
a fastener for connecting with the exhaust duct, the fastener comprising:
a shaft for extending through a duct opening in the exhaust duct; and
a head connected to an end of the shaft for positioning inside the exhaust duct;
a bushing insertable into the duct opening, the bushing comprising:
a body for insertion into the duct opening, the body having a major axis and a minor axis;
a bushing opening extending through the body along an opening axis to receive the shaft of the fastener;
a peripheral flange extending along an entirety of a periphery of the body to prevent the body from passing through the duct opening; and
a first tab protruding from the body along a tab axis and for extending into the duct, the first tab being positioned to prevent rotation of the head within the duct and the tab axis extending parallel to the opening axis;
a second tab protruding from the body for extending into an interior of the exhaust duct, the second tab spaced along the bushing opening opposite the first tab; and
a nut for engaging the shaft of the fastener and securing the fastener with the bushing.

10. The bushing assembly of claim 9 wherein the first tab is positioned such that a major axis of the head of the fastener is transverse to the major axis of the body when the head is adjacent the body.

11. The bushing assembly of claim 9 wherein the first tab is positioned on the major axis.

12. The bushing assembly of claim 9 wherein the bushing opening and the shaft have matching profiles.

13. The bushing assembly of claim 9 wherein the bushing and the fastener have similar coefficients of thermal expansion such that the bushing maintains a seal around the shaft of the fastener.

14. The bushing assembly of claim 9 wherein the head of the fastener is elongate.

15. The bushing assembly of claim 9 wherein the first tab protrudes from the body so as to be spaced from the peripheral flange.

\* \* \* \* \*